United States Patent [19]
Rost

[11] Patent Number: 6,087,977
[45] Date of Patent: Jul. 11, 2000

[54] FALSE ALARM RATE AND DETECTION PROBABILITY IN A RECEIVER

[75] Inventor: David P. Rost, Malverne, N.Y.

[73] Assignee: Cardion Newco, Inc., Shawnee, Kans.

[21] Appl. No.: 08/829,275

[22] Filed: Mar. 31, 1997

[51] Int. Cl.$^7$ .............................. G01S 7/292; G01S 7/34
[52] U.S. Cl. .......................... 342/93; 342/159; 342/205
[58] Field of Search .............................. 342/93, 91, 159, 342/162, 195, 197, 205

[56] References Cited

U.S. PATENT DOCUMENTS

| | | | |
|---|---|---|---|
| 3,611,369 | 10/1971 | Maguire | 342/91 |
| 4,051,473 | 9/1977 | Hooker, Jr. | 342/93 |
| 4,103,301 | 7/1978 | Evans | 342/93 |
| 4,187,501 | 2/1980 | Olesch et al. | 340/554 |
| 4,219,812 | 8/1980 | Rittenbach | 342/110 |
| 4,370,652 | 1/1983 | Lucchi | 342/101 |
| 4,398,196 | 8/1983 | Wiegand | 342/192 |
| 4,463,356 | 7/1984 | Short, III et al. | 342/94 |
| 4,477,811 | 10/1984 | Collins, IV | 342/173 |
| 4,600,924 | 7/1986 | Lobsinger et al. | 342/98 |
| 4,684,950 | 8/1987 | Long | 342/94 |
| 4,688,041 | 8/1987 | Cronson et al. | 342/17 |
| 4,688,042 | 8/1987 | Cronson et al. | 342/19 |
| 4,782,343 | 11/1988 | Marchais | 342/160 |
| 4,837,579 | 6/1989 | Pease et al. | 342/197 |
| 5,144,315 | 9/1992 | Schwab et al. | 342/49 |
| 5,337,054 | 8/1994 | Ross et al. | 342/93 |
| 5,539,412 | 7/1996 | Mendelson | 342/192 |
| 5,644,315 | 7/1997 | Long | 342/93 |

OTHER PUBLICATIONS

Skolnik, Merill I. Editor, *Radar Handbook*, pp. 3.46–3.53, 2nd Ed., McGraw–Hill (1990).

Primary Examiner—John B. Sotomayor
Attorney, Agent, or Firm—Bryan Cave LLP

[57] ABSTRACT

An improved performance receiver associated with a radar system for detecting targets over a specified range area whereby the receiver, which is responsive to a return signal corresponding to an actual target or a false target, includes: an attenuator for attenuating an amplitude associated with the return signal; sensitivity time control means coupled to the attenuator wherein the attenuation is coordinated to the sensitivity time control means and the attenuation of the return signal is selectively variable such that the amplitude of the return signal is attenuated to a first level at closer ranges of the specified range area and attenuated to a second level at farther ranges of the specified range area, the first level being greater than the second level; a mixer for downconverting the return signal to a signal exhibiting an intermediate frequency; a detector for extracting a target video signal from the downconverted return signal; detection threshold setting means for generating a detection threshold signal; and a comparator for comparing the target video signal to the detection threshold signal to generate a comparator output signal indicating whether the target video signal is at least greater than the threshold detection signal; wherein the threshold associated with the detection threshold signal is selectively variable such that the threshold may be varied in coordination with the varied attenuation of the amplitude of the return signal provided by the sensitivity time control means in order that a probability of false target detection and/or a probability of actual target detection are substantially improved.

20 Claims, 4 Drawing Sheets

FALSE ALARM RATE AND DETECTION PROBABILITY IN A RECEIVER

BACKGROUND OF THE INVENTION

1. Field of the Invention

The present invention relates to methods and apparatus for improving the performance of a receiver and, more particularly, to improving the false alarm rate and detection probability in a receiver employing sensitivity time control.

2. Description of the Prior Art

The use of constant false alarm rate (CFAR) receivers in search and surveillance type radar systems is well known. It is typical for such radar systems to operate in environments where undesired echoes or return signals from adverse weather conditions and surface clutter (sea and/or ground, depending upon the radar application) are substantial. Such undesired echoes are sources of interference which can severely interfere with a radar display and/or overload data processing equipment associated with the radar receiver. At times, such interference may rival the thermal noise levels attributable to the radar receiver.

It is known that both the probability of detection of a desired target and the probability of false alarms (undesired detections erroneously classified as targets) are dependent upon the level of receiver thermal noise and interference caused by adverse weather and surface clutter. The thermal noise attributed to the receiver is typically constant over the operable range of the receiver; however, because of the variation in interference levels due to weather and clutter, it is often desirable to set a constant threshold level for the false alarm rate (i.e., CFAR performance). Typically, such a receiver implementing CFAR senses the magnitude of the radar echoes from noise and clutter and uses this information to set a threshold in order that noise and clutter echoes are substantially rejected at and below the threshold and not erroneously recognized as actual targets. When the magnitude of the radar echoes from noise and clutter is sensed in the near vicinity of the target, this is known as area CFAR. Nonetheless, the threshold may be varied depending on the prevailing conditions of clutter and noise.

There are several known approaches to designing CFAR receivers. A typical design approach includes a mixer used to translate or downconvert the received RF return signal to an intermediate frequency (IF) signal. The mixer is normally coupled to an IF amplifier wherein the signal is amplified before being presented to a detector. The amplifier may be a logarithmic amplifier, as will be explained, or a linear amplifier. Sensitivity time control (STC) may also be implemented in the receiver. In general, sensitivity time control (STC) is a process which causes radar receiver sensitivity to vary with time such that the amplitude associated with the IF return signal is independent of range (i.e., constant as a function of range). STC is desirable due to the fact that search and surveillance radars detect return signals of different amplitudes, typically so great that the dynamic range of a receiver not having STC (i.e., fixed-gain receiver) will be exceeded. When STC is implemented before frequency downconversion from RF to IF then it is known as RF STC, implementation after downconversion is known as IF STC.

As previously mentioned, the amplified and STC responsive signal is then passed on to a detector, such as an AM envelope detector, where the desired target information is separated from the carrier signal. CFAR levels are adjusted either automatically by the computer processing equipment or manually by an operator attentive to the prevailing environmental conditions. There are many other types of design techniques for implementing CFAR, several of which are discussed in detail in the text entitled: "Radar Handbook" by Merrill Skolnick, pp. 3.46–3.53, 2nd ed. (1990).

However, while CFAR is typically necessary in order to avoid processing overload conditions, there are disadvantages and limitations associated with CFAR receivers. For instance, it is known that CFAR reduces the probability of detection, causes a loss in the signal-to-noise (S/N) ratio, and degrades range resolution. Furthermore, certain users of radar systems which implement CFAR, such as Air Traffic Controllers (ATCs) who are viewing the radar output of an airport Surface Movement Radar (SMR) on their displays, may not be as interested in a constant false alarm rate as they might be with a constant probability of detection with a varying false alarm rate (assuming that the worst probability of false alarm is satisfactory).

Generally, it would be desirable to provide a radar receiver capable of implementing CFAR performance, if desired, but which would advantageously provide an improved false alarm rate without substantially degrading the probability of detection, the S/N ratio, or the range resolution associated with the receiver. In fact, it would also be desirable to provide such a radar receiver which achieves the above-mentioned advantages, yet also actually increases the probability of detection.

Specifically, it would be desirable to provide a low cost receiver capable of implementing CFAR which utilizes a logarithmic amplifier and RF STC and which overcomes the limitations associated with degraded probability of false alarms due to the use of RF STC.

SUMMARY OF THE INVENTION

In accordance with the principles of the present invention, a method of improving the performance of a receiver associated with a radar system for detecting targets within a specified range area, whereby the receiver is responsive to a return signal corresponding to an actual target or a false target, includes the steps of: attenuating an amplitude associated with the return signal in cooperation with sensitivity time control means wherein the attenuation is selectively variable such that the amplitude of the return signal is attenuated to a first signal level at closer ranges of the specified range area and attenuated to a second signal level at farther ranges of the specified range area, the first signal level being greater than the second signal level; extracting a target video signal from the return signal; and comparing the target video signal to a detection threshold signal provided by detection threshold setting means to generate a compared output signal indicating whether the target video signal is greater than the threshold detection signal, wherein the threshold associated with the detection threshold signal is selectively variable such that the threshold may be varied in coordination with the varied attenuation of the amplitude provided by the sensitivity time control in order that either a probability of false target detection or a probability of actual target detection (but preferably both) is substantially improved.

In response to the drawbacks associated with receivers which implement CFAR performance and taking into account the interrelationship between the S/N ratio, detection threshold and false alarm rate in any receiver, as will be discussed, the present invention provides unique solutions to the inherent problems which exist with respect to such related prior art receivers. Such solutions are found in the methods taught by the invention and the improved performance receivers formed in accordance therewith, as will be explained later in greater detail. One significant aspect of the present invention, as mentioned in the method summarized above, includes correspondingly varying both the detection threshold and the sensitivity time control associated with a receiver in order to realize a varying false alarm rate. Preferably, corresponding selective variation of the detection threshold and the sensitivity time control in accordance with the present invention advantageously yields a decreased false alarm rate and an increased S/N ratio at closer ranges with respect to the receiver. Also, due to the increase in sensitivity at closer range, an increase in the probability of detection is also possible.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
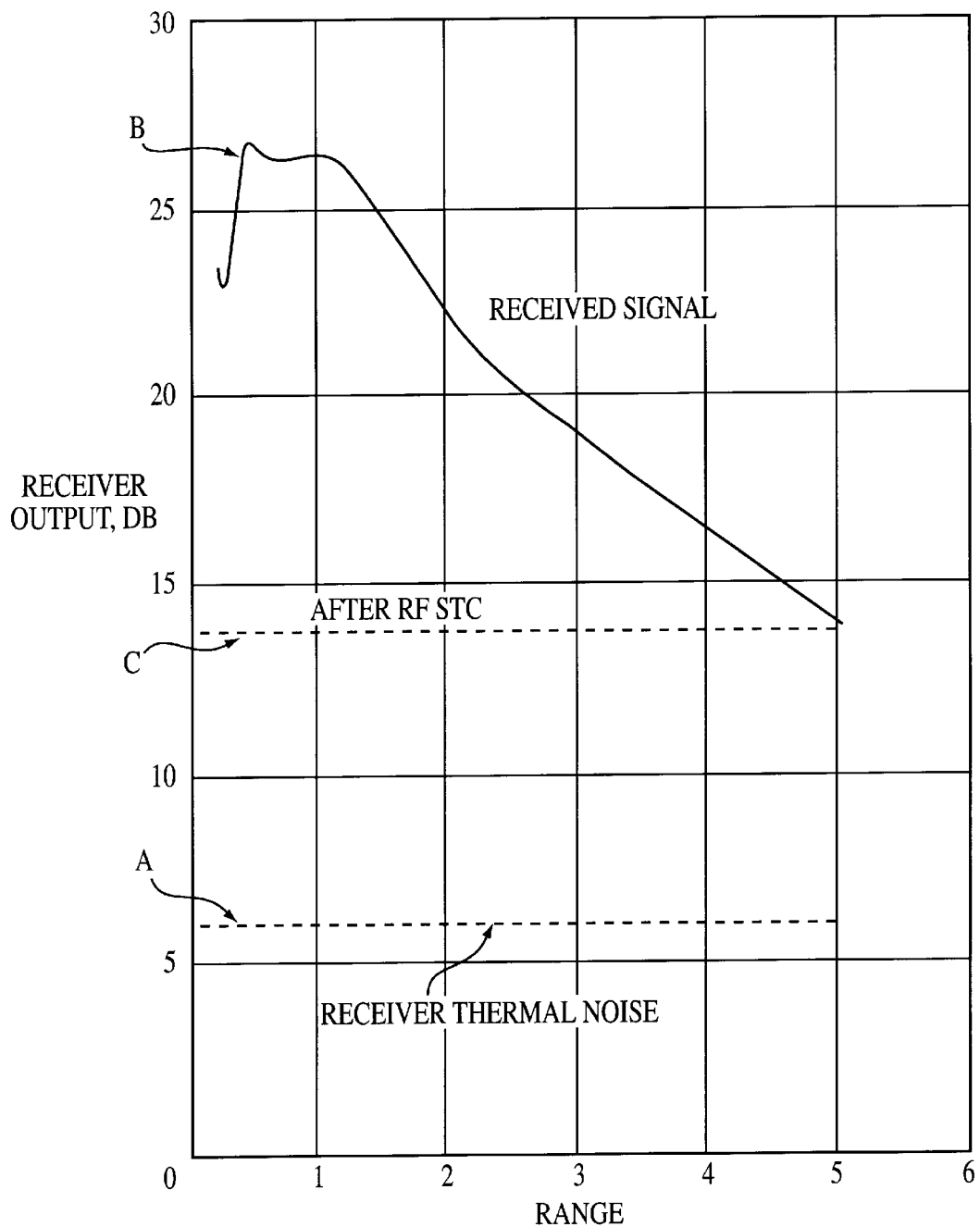
FIG. 1 is a graphical plot of receiver output versus range for a typical radar receiver.

Prior to a detailed description of the present invention, a brief discussion of background information, intended to aid in the understanding of the inventive teachings disclosed herein, is presented. Referring initially to FIG. 1, a graphical plot of a typical radar receiver output versus range is shown. In general, it is known that receiver thermal noise is considered to be the ultimate limitation on radar performance. The thermal noise attributable to a receiver adversely affects both the probability of detection and the false alarm rate associated with that receiver. A typical level of receiver thermal noise is depicted in FIG. 1 by phantom line A. As shown, the thermal noise is constant over the entire operating range of the receiver. Further, a typical unattenuated return signal is illustrated in FIG. 1 by solid line B. The unattenuated return signal is a function of range thereby, as can be seen, exhibiting greater signal strength for target reflections which occur at relatively close range to the receiver and diminishing signal strength for target reflections which occur at increasingly distant ranges for the receiver.

It is known that if the radar receiver implements sensitivity time control (STC), as previously discussed, prior to downconversion of the return signal to an intermediate frequency (RF STC), then the return signal strength is no longer a function of range, but rather can be made substantially constant over all operable ranges, as is the case with respect to the receiver thermal noise. The return signal, subsequent to implementation of RF STC, is depicted in FIG. 1 by phantom line C at a constant level. It is to be appreciated that the implementation of STC provides for a S/N ratio needed to achieve the desired CFAR performance.

However, as previously mentioned, CFAR degrades certain aspects of overall receiver performance. For example, the S/N ratio, which otherwise is relatively large at close range as can be seen in FIG. 1 by comparing line B with respect to line A at closer ranges, is degraded to the implementation of STC. Further, an otherwise relatively large amplitude return signal (which is theoretically desirable) is being degraded due to the STC attenuation. As a result of the implementation of CFAR, as shown in FIG. 1, not only is a constant probability of false alarm (Pfa) prescribed but a constant probability of detection (Pa) is also a byproduct of this technique. It is also known that implementation of CFAR causes a degradation in the best achievable false alarm rate at closer ranges, which is an area of coverage that may be better served by an improved (lower) false alarm rate. Of course, it is to be understood that CFAR, despite its drawbacks, may still be operationally desirable due to concerns of system overload in processing equipment and/or displays.

By way of example, a typical specified false alarm rate for an airport Surface Movement Radar (SMR) is approximately $10^{-6}$. Such rate, at first glance, seems to be appreciably inconsequential until one considers that there are typically over $10^6$ radar resolution cells in a single scan of an airport SMR. As a result, there would be typically more than one false alarm per scan. It is to be understood that the resolution cell for an SMR is set by the azimuth beamwidth and the transmitter pulsewidth. Typical values for the azimuth beamwidth and the transmitter pulsewidth may be approximately 0.25 degrees and approximately 5.5 meters, respectively. Such values yield approximately 1440 azimuth cells in a scanning area of 360 degrees and approximately 1024 range cells given a maximum range of approximately 5500 meters. As a result, there would be approximately 1,474,560 (1440× 1024) cells per scan. Since the normal scan rate associated with an airport SMR is approximately once per second (i.e., 60 RPM), there would be approximately 60 false alarms per minute and, therefore, approximately 3600 per hour. Such a false alarm rate is extremely excessive for the ATCs viewing the SMR displays, simply because they do not have the time to observe all the false alarms, which are essentially false target indications, in order to determine whether or not they are true targets. Fortunately, only about 5% of the coverage area associated with an airport SMR represents operationally significant sections of the airport, i.e., runways and taxiways. As a result, the false alarm rate is reduced to about 3 false alarms per minute or about 180 false alarms per hour. Nonetheless, 180 false alarms per hour is still an excessively high number for ATCs to process.

Figure 2:
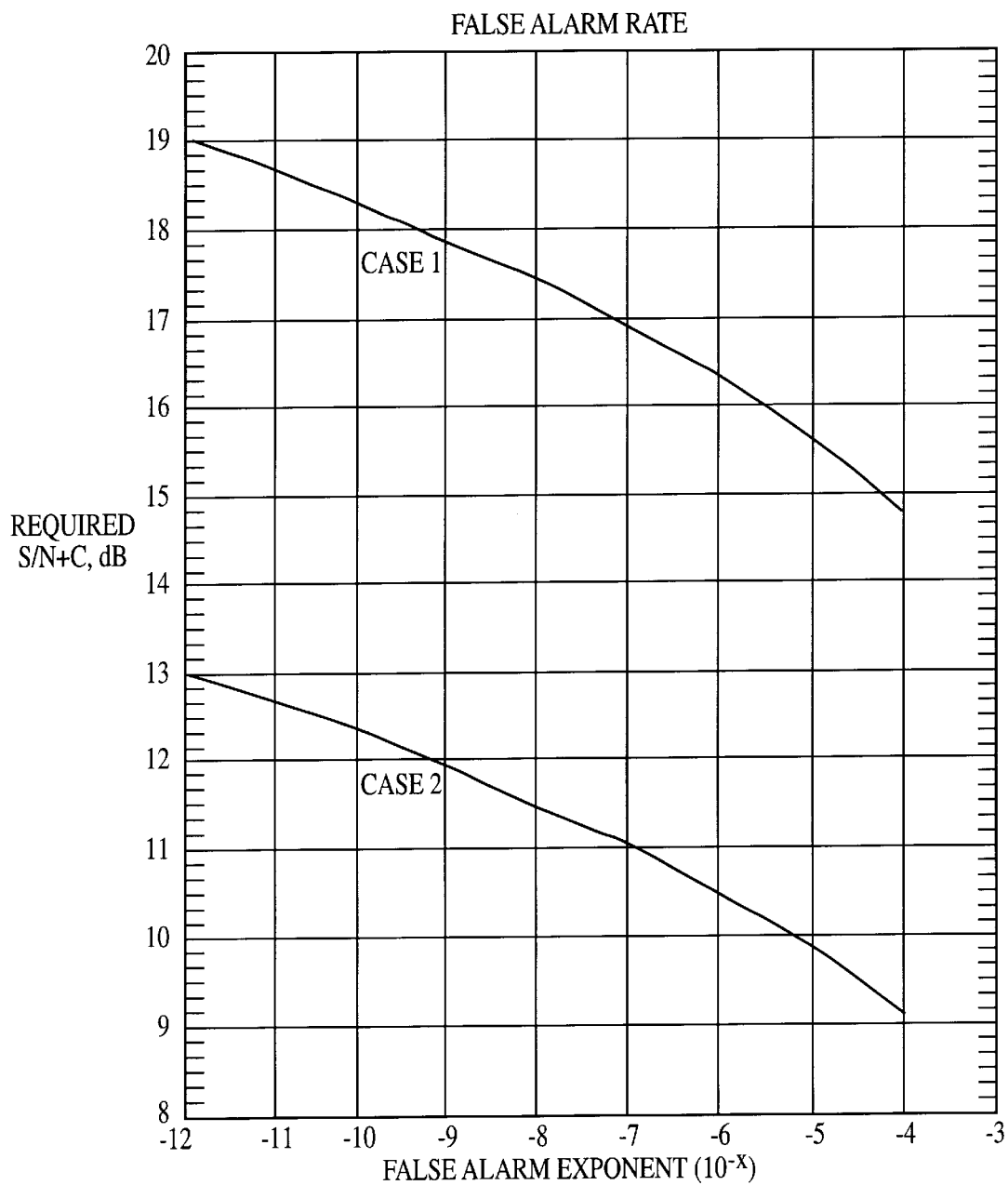
FIG. 2 is a graphical plot of signal-to-noise (S/N) ratio versus false alarm rate for typical Swerling Cases assuming azimuth filtering of four sweeps.

Referring now to FIG. 2, a graphical plot illustrating the typical interrelationship between S/N ratio and false alarm rate is shown. Detection processing typically includes comparing the amplitude of a return signal with a threshold whereby a detection is reported if the amplitude exceeds that threshold. A false alarm occurs when noise or other interference causes an output of sufficient magnitude to exceed the detection threshold. In theory, as the detection threshold is decreased, both probabilities of detection, Pd, and of false alarm, Pfa, increase. FIG. 2 illustrates a Swerling Case 1 (slowly fluctuating radar cross section) target and a Swerling Case 2 (rapidly fluctuating radar cross section) target. It is to be appreciated that Case 1 applies to real targets, while Case 2 can also apply to real targets if frequency agility or diversity is employed to convert the situation from Case 1 to Case 2.

It is also known that the false alarm rate may be reduced by increasing the processing (detection) threshold. As exemplified in FIG. 2, depending on the S/N ratio, an increase of 1 dB in the threshold can reduce the false alarm rate by a factor of 100/1. Using the airport SMR explained above as an example, such a 1 dB threshold increase would yield a false alarm rate for operational areas of approximately 1.8 false alarms per hour or approximately 33 minutes between false alarms. Further, it is to be observed that increasing the threshold by another 1 dB would further reduce the false alarm rate by another factor of 100/1, yielding a time between false alarms of approximately 55 hours, which would be more than satisfactory to ATCs. However, it is to be appreciated that simply raising the detection threshold by about 2 dB at all ranges reduces the detection sensitivity of the receiver for small targets, especially in adverse weather conditions (e.g., rainfall). As a result, operationally significant targets would be lost (not detected), particularly near maximum operational range.

In response to the drawbacks associated with receivers which implement CFAR performance and taking into account the interrelationship between the S/N ratio, detection threshold and false alarm rate in any receiver, the present invention provides unique solutions to the inherent problems which exist with respect to such related prior art receivers. One significant aspect of the present invention provides for correspondingly varying both the detection threshold and the sensitivity time control associated with a receiver in order to realize a varying false alarm rate. Preferably, corresponding selective variation of the detection threshold and the sensitivity time control in accordance with the present invention advantageously yields a decreased false alarm rate and an increased S/N ratio at closer ranges with respect to the receiver. Also, due to the increase in sensitivity at closer range, an increase in the probability of detection, Pd, can also be realized.

Figure 3:
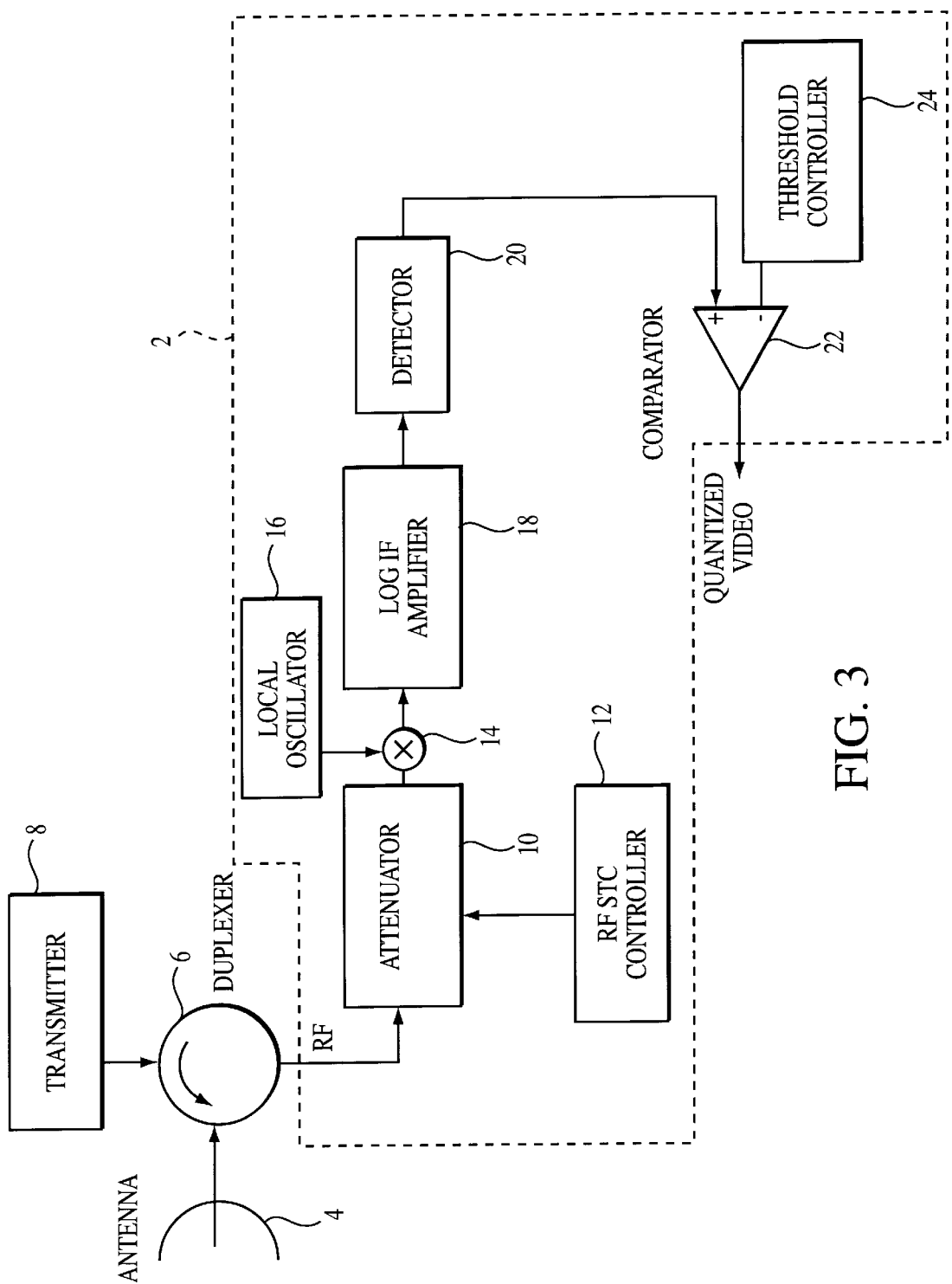
FIG. 3 is a block diagram of a preferred embodiment of a receiver of the present invention.
Figure 4:
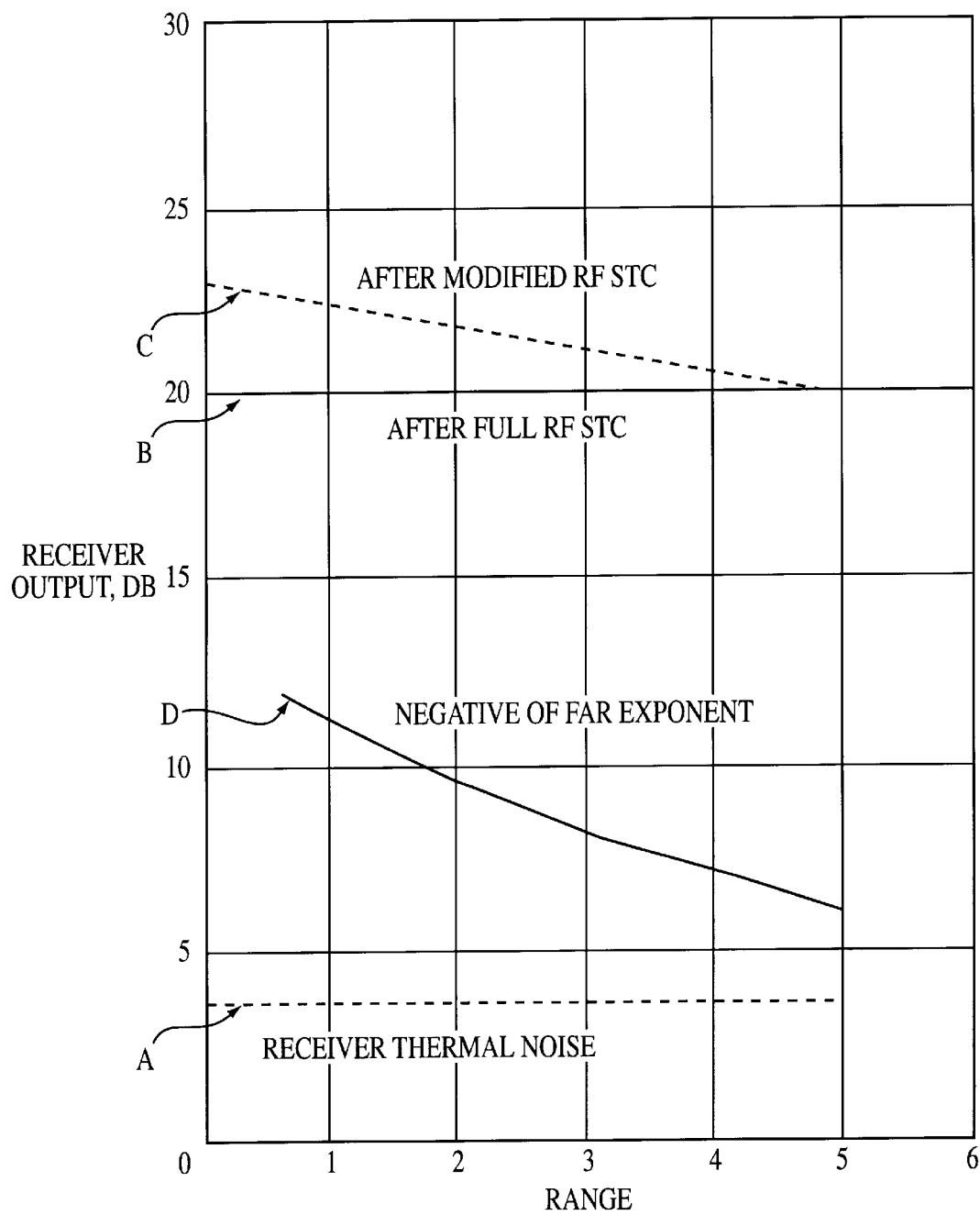
FIG. 4 is an exemplary graphical plot of receiver output versus range for a receiver of the present invention.

Referring now to FIGS. 3 and 4, a preferred embodiment of the present invention is illustrated in the form of a block diagram of an exemplary receiver design approach for implementing the invention (FIG. 3) and a graphical plot of the associated receiver output versus range (FIG. 4) with respect to such a receiver. Specifically a receiver 2 of the present invention is shown operatively coupled to an antenna 4 through a duplexer 6. The duplexer 6 is also coupled to a transmitter 8 and permits the transmitter 8 and receiver 2 to operate in cooperation with the single antenna 4. However, it is to be understood that the receiver 2 of the present invention may operate separate of the transmitter 8 with its own antenna dedicated to receiving return signals.

The receiver 2, itself, includes an attenuator 10 having an input port, an output port and a control port; an RF STC controller 12 having an output port; a mixer 14 having first and second input ports and an output port; a local oscillator 16 having an output port; a logarithmic IF amplifier 18 having input and output ports; a detector 20 having input and output ports; a comparator 22 having first and second input ports and an output port; and a threshold controller 24 having an output port.

The input port of the attenuation 10, which may serve as the input port of the receiver, is operatively coupled to the duplexer 6, while the output port of the attenuator 10 is operatively coupled to the first input port of the mixer 14. The control port of the attenuator 10 is operatively coupled to the output port of the RF STC controller 12. Further, the second input port of the mixer 1 is operatively coupled to the output port of the local oscillator 16, while the output port of the mixer 14 is operatively coupled to the input port of the logarithmic IF amplifier 18. The output port of amplifier 18 is operatively coupled to the input port of the detector 20; while the output port of the detector 20 is operatively coupled to the first input port of the comparator 22. The second input port of the comparator 22 is operatively coupled to the output port of the threshold controller 24. It is to be understood that the output port of the comparator 22 may serve as the receiver output such that said output port is operatively coupled to additional downstream computer processing equipment or the radar display (not shown).

It is to be appreciated that the goal of varying Pfa with range, described herein in accordance with the invention, could also be achieved with a linear receiver and IF STC. However, it is known that IF STC cannot be easily implemented with a logarithmic IF amplifier. The logarithmic amplifier is a device whose output is proportional to the logarithm of the envelope of the signal input thereto. Accordingly, STC operation is preferably implemented by the receiver of the invention by providing STC at an attenuator 10 prior to downconversion of the return signal to an intermediate frequency, that is, the present invention provides RF STC operation rather than the typical IF STC operation. However, as will be explained, the present invention further provides for selective variation of the RF STC in order to provide improved probability of detection and probability of false alarm.

As mentioned previously, the desire to reduce the number of false alarms that a radar display operator must be attentive to and differentiate from actual targets may lead to the conclusion that raising the detection threshold will reduce the number of false alarms. While this is theoretically true, the realistic problem remains that if the threshold is increased too much, detection of actual targets is adversely affected because of the fact that actual targets that fall beneath the increased threshold will no longer be detected. Particularly, at close range and depending on the application of the radar system (e.g., airport SMR), this can result in disastrous consequences (e.g., loss of detection of smaller aircraft on airport runways and taxiways).

Thus, the present invention provides an improved performance receiver, such as the receiver 2 illustrated in FIG. 3, wherein not only is the detection threshold selectively varied, but the receiver sensitivity is selected in order to permit larger received (return) signals at shorter ranges. In a preferred embodiment, as the detection threshold is selectively varied (preferably increased), the RF STC may be suitably varied such that, for close ranges, the sensitivity of the receiver is increased thereby permitting larger return signals. In this way, even though the detection threshold is increased thereby decreasing the rate of false alarms, the probability of detection of targets at closer ranges is increased because of the fact that the receiver of the invention reduces the STC related attenuation of return signals at such closer ranges thereby increasing receiver sensitivity.

Another way to view such an improvement over existing receivers is from the perspective of the S/N ratio. It is known that if the S/N ratio can be increased that the probability of false alarms decreases and the probability of detection increases. Thus, by increasing the sensitivity of the receiver (decreasing attenuation due to STC) in accordance with the present invention, the S/N ratio is correspondingly increased and the above results follow, i.e., Pfa decreases and Pd increases.

In an alternative embodiment, it is to be understood that the same advantageous results of this invention could be realized by utilizing no RF STC and instead causing the detection threshold to be a function of the predicted received (return) signal. In this way, as explained above, as the magnitude of the return signal received by the receiver increases thus correspondingly increasing the probability of detection, the detection threshold increases thus correspondingly decreasing the probability of false alarms. Such an alternative embodiment of the present invention would substantially represent maximum control over false alarm rate and detection performance in applicable receivers. However, in a preferred embodiment, RF STC is implemented and varied in cooperation with the variation of the detection threshold in order that a large variation of the threshold, which may be necessary in the above-described alternative embodiment, is not necessarily required in such preferred embodiment. Of course, it should be understood that a receiver of the invention could implement CFAR performance, if desired, simply by not varying RF STC in the unique manner described herein.

In accordance with the graphical plot of FIG. 4, an example of a preferred embodiment of the invention will now be explained. The thermal noise associated with the receiver is illustrated by phantom line A as constant for all ranges. Two plots of receiver output are shown in FIG. 4. Line B illustrates a return signal at approximately 16.4 dB over receiver noise which is what the receiver output would reflect if full RF STC (no tapering of RF STC with range as is done by the invention) were implemented as is known in the art. However, line C illustrates the teachings of the invention whereby the RF STC is varied (i.e., modified) such that receiver sensitivity is increased by approximately 3 dB at minimum range and then tapered to a typical RF STC level. It is to be understood that while FIG. 4 shows the unique tapering of the signal amplitude level to be linear, the invention is not limited thereto. That is, the tapering may be exponential, stepped or any other applicable form of tapering. The chosen form of tapering is dependent on the S/N ratio available and how the improvement is to be preferably distributed. Also, it is to be understood that one of ordinary skill in the art, based on the teachings described herein, will appreciate various techniques for implementing the attenuation advantageously imposed on the return signal. Thus, as can be seen, the receiver sensitivity is actually adjusted to approximately 19.4 dB above receiver noise at minimum receiver range. In addition, as mentioned, the detection threshold is also increased by 3 dB at minimum receiver range and, as a result the improvement to the false alarm rate is illustrated by line D. Line D represents the negative exponent, x, associated with the false alarm rate (i.e., $10^{-x}$) whereby it is seen that the exponent is more negative at closer ranges corresponding to a lower false alarm rate (lower Pfa) and less negative at farther ranges corresponding to a higher false alarm rate (higher Pfa).

Specifically, a receiver implementing full RF STC (i.e, untapered in range) as shown by line B would yield a Pd of approximately 0.9 and a Pfa of approximately $10^{-6}$. It is to be appreciated that the derivation of such known measurements is discussed in the text entitled: "A Guide to Basic Pulse Radar Maximum Range Calculation" by L. V. Blake, Naval Research Lab (NRL) Report No. 6930 (1969) and NRL Report No. 7010 (1969). However, a receiver implementing RF STC tapered in range in accordance with the invention, as shown by line C of FIG. 4, yields a 3 dB reduction in thermal noise (because the threshold is raised by 3 dB) at minimum range. Line D illustrates the resulting false alarm performance in terms of negative powers of ten and, as can be seen, the false alarm rate advantageously improves by more than approximately 100 at 60% (3.0 on horizontal scale) range and by more than approximately 10,000 at 40% (2.0 on horizontal scale)range. It should be understood that the approximate values of improvement may be estimated from FIG. 4 by utilizing the units on the vertical scale to refer to negative exponents of ten ($10^{-x}$) and by considering the horizontal scale from 0 to 5 to represent 100% range. With regard to a radar system such as an airport SMR, such improvement in false alarm rate at closer ranges is significant, since such SMR systems typically track most of their operationally significant targets at closer ranges. Thus, ATCs can have more confidence in their displays, particularly, at closer ranges.

Referring again to FIG. 3, it is to be appreciated that such a receiver configuration is one preferred form for implementing the teachings of the present invention described above. However, it is to be understood that such inventive teachings may be implemented in any alternative manner as may be contemplated by one of ordinary skill in the art. Nonetheless, the configuration illustrated in FIG. 3 will be used to further disclose the novel aspects of the present invention. Specifically, an RF return signal is received by antenna 4 which is presumably a radar echo from either an actual target or a false target, such as some form of clutter or interference. The RF return signal is provided to receiver 2 by duplexer 6 which, in a common antenna configuration as exemplified in FIG. 3, selectively switches the coupling of the antenna between the transmitter 8 and the receiver 2. The RF return signal is received by the attenuator 10 wherein RF STC is provided in accordance with the invention. Particularly, RF STC controller 12 provides an RF STC control signal to the control port of attenuator 10. As opposed to typical (full) RF STC, the RF STC control signal of the invention is so conditioned as to cause the attenuator 10 to attenuate the RF return signal in the manner described above. Particularly, the magnitude of the RF return signal is attenuated to a first level at minimum range and then preferably tapered to a second level at some range thereafter. The second level is less than the first level. As per the example shown in FIG. 4, the first level is approximately 3 db over the magnitude of a return signal subjected to full RF STC and then the increased magnitude is tapered (decreased) down to the full RF STC level at some chosen range between the minimum and maximum operating range of the receiver.

Next, the RF return signal attenuated in accordance with the invention is downconverted as is known in the art by mixer 14 in cooperation with the local oscillator 16. However, it is to be appreciated that downconversion, while preferred, is not necessary for accomplishing the teachings of the present invention. The advantages described herein may be achieved without frequency conversion of the return signal from RF to IF. Nonetheless, an attenuated IF return signal is generated and presented to the logarithmic IF amplifier 18 where the signal is amplified. The amplified and attenuated IF return signal is then presented to the detector 20 which may be a conventional AM (diode) envelope detector. The detector 20 extracts the target information (e.g. target video) from the carrier signal of the IF return signal.

The target video is presented to one input port of the comparator 22 where the signal is compared to a detection threshold signal provided to the opposing input port of the comparator 22 by threshold controller 24. It is to be appreciated that the detection threshold signal may be selectively varied in accordance with the invention as described above. Depending on the threshold established by the threshold controller 24, comparator 22 determines if the target associated with the target video signal is above that threshold level. If the target signal is above the threshold than the comparator 24 outputs a quantized video signal to additional processing stages (not shown) or to the radar operator (ATC) display (not shown) where a target is displayed thereon.

As explained above, the target may be an actual target or a false alarm (false target detection due to excessive clutter or noise). However, in accordance with the teachings provided herein, due to the modification of the RF STC and the varying of the detection threshold, the false alarm rate is substantially reduced at closer operating ranges which is significantly advantageous to radar display operators (ATCs) where a significant portion of the coverage area is at closer range (airport SMR). However, as an additional advantage, due to the possibility of further increasing the S/N ratio at the closer ranges, the probability of detection could also be increased.

It is to be appreciated that the threshold controller 24 discussed above may simply include a radar display operator who is attentive to the prevailing clutter and interference conditions and who may manually adjust the detection threshold in accordance with a look-up table which provides him with the detection threshold for varying clutter and interference conditions. Alternatively, the quantized video signal from the comparator 22 may be provided to an alternative embodiment of threshold controller 24 including additional computer processing equipment for forming a closed loop control system which automatically varies the detection threshold applied to the detection threshold input port of comparator 22. In such a case, the closed loop system would make the threshold variation determination in accordance with clutter and interference conditions and the corresponding look-up tables.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of improving the performance of a receiver associated with a radar system for detecting targets within a specified range area, the receiver being responsive to a return signal corresponding to one of an actual target and a false target, the method comprising the steps of:
    a) attenuating the return signal in cooperation with sensitivity time control means wherein the attenuation is selectively variable such that the amplitude of the return signal is attenuated to a first level at closer ranges of the specified range area and attenuated to a second level at farther ranges of the specified range area, the first level being greater than the second level;
    b) extracting a target video signal from the variably attenuated return signal; and
    c) comparing the target video signal to a detection threshold signal provided by detection threshold setting means to generate a compared output signal indicating whether the target video signal is at least greater than the threshold detection signal, wherein the threshold associated with the detection threshold signal is selectively variable such that the threshold may be varied in coordination with the varied attenuation of the amplitude provided by the sensitivity time control in order that one of a probability of false target detection and a probability of actual target detection is substantially improved.

2. The method of claim 1, wherein the attenuating step further includes tapering the level of attenuation of an amplitude associated with the return signal between the first level and the second level.

3. The method of claim 2, wherein the tapering of the level of attenuation is substantially linear between the first level and the second level.

4. The method of claim 1, further comprising the step of amplifying the return signal prior to extraction of the target video signal.

5. The method of claim 4, wherein the return signal is logarithmically amplified prior to extraction of the target video signal.

6. The method of claim 1, wherein the detection threshold setting means includes means for manual variation of the threshold associated with the detection threshold signal, the manual variation means including a radar operator adjusting the threshold in accordance with a threshold look-up table which corresponds to at least one of prevailing clutter and interference conditions.

7. The method of claim 1, wherein the detection threshold setting means includes means for automatic variation of the threshold associated with the detection threshold signal, the automatic variation means including a closed loop system responsive to the compared output signal and operatively coupled to the detection threshold setting means wherein the automatic variation is a function of a threshold look-up table which corresponds to at least one of prevailing clutter and interference conditions.

8. An improved performance receiver associated with a radar system for detecting targets over a specified range area, the receiver being responsive to a return signal corresponding to one of an actual target and a false target, the receiver comprising:
    means for attenuating an amplitude associated with the return signal including sensitivity time control means wherein the attenuation is selectively variable such that the amplitude of the return signal is attenuated to a first level at closer ranges of the specified range area and attenuated to a second level at farther ranges of the specified range area, the first level being greater than the second level;
    means for extracting a target video signal from the variably attenuated return signal;
    means for providing a detection threshold signal; and
    means for comparing the target video signal to the detection threshold signal to generate a compared output signal indicating whether the target video signal is at least greater than the threshold detection signal;
    wherein the threshold associated with the detection threshold signal is selectively variable such that the threshold may be varied in coordination with the varied attenuation of the amplitude provided by the sensitivity time control means in order that one of a probability of false target detection and a probability of actual target detection is substantially improved.

9. The improved performance receiver of claim 8, wherein the means for attenuating tapers the level of attenuation of the amplitude associated with the return signal between the first level and the second level.

10. The improved performance receiver of claim 9, wherein the tapering of the level of attenuation is substantially linear between the first level and the second level.

11. The improved performance receiver of claim 8, further comprising means for amplifying the return signal prior to extraction of the target video signal.

12. The improved performance receiver of claim 11, wherein the amplifying means includes logarithmic amplifying means.

13. The improved performance receiver of claim 8, wherein the radar system with which the receiver operates is an airport surface movement radar system.

14. An improved performance receiver associated with a radar system for detecting targets over a specified range area, the receiver being responsive to a return signal corresponding to one of an actual target and a false target, the receiver comprising:

an attenuator responsive to the return signal for attenuating an amplitude associated with the return signal;

sensitivity time control means being coupled to the attenuator wherein the attenuator is responsive to the sensitivity time control means and the attenuation of the return signal is selectively variable such that the amplitude of the return signal is attenuated to a first level at closer ranges of the specified range area and attenuated to a second level at farther ranges of the specified range area, the first level being greater than the second level;

a detector for extracting a target video signal from the return signal;

detection threshold setting means for generating a detection threshold signal; and a comparator for comparing the target video signal to the detection threshold signal to generate a comparator output signal indicating whether the target video signal is at least greater than the threshold detection signal;

wherein the threshold associated with the detection threshold signal is selectively variable such that the threshold may be varied in coordination with the varied attenuation of the amplitude of the return signal provided by the sensitivity time control means in order that one of a probability of false target detection and a probability of actual target detection is substantially improved.

15. The improved performance receiver of claim 14, further comprising an amplifier operatively coupled between the attenuator and the detector for amplifying the return signal.

16. The improved performance receiver of claim 15, wherein the amplifier is a logarithmic amplifier.

17. The improved performance receiver of claim 14, wherein the attenuator in response to the sensitivity time control means tapers the level of attenuation of the amplitude associated with the return signal between the first level and the second level.

18. The improved performance receiver of claim 17, wherein the tapering of the level of attenuation is substantially linear between the first level and the second level.

19. The improved performance receiver of claim 14, wherein the detection threshold setting means includes means for manual variation of the threshold associated with the detection threshold signal, the manual variation means including a radar operator adjusting the threshold in accordance with a threshold look-up table which corresponds to at least one of prevailing clutter and interference conditions.

20. The improved performance receiver of claim 14, wherein the detection threshold setting means includes means for automatic variation of the threshold associated with the detection threshold signal, the automatic variation means includes a closed loop system operatively coupled between the comparator and the detection threshold setting means wherein the automatic variation is a function of a threshold look-up table which corresponds to at least one of prevailing clutter and interference conditions.

* * * * *